3,331,756
AZEOTROPIC DISTILLATION OF DIETHYLENE-
TRIAMINE AND AMINOETHYLETHANOLA-
MINE FROM PIPERAZINE RESIDUE
Vernon A. Currier and John G. Milligan, Austin, Tex.,
assignors to Jefferson Chemical Company Inc., Houston Tex., a corporation of Delaware
Filed Nov. 23, 1964, Ser. No. 413,142
2 Claims. (Cl. 203—69)

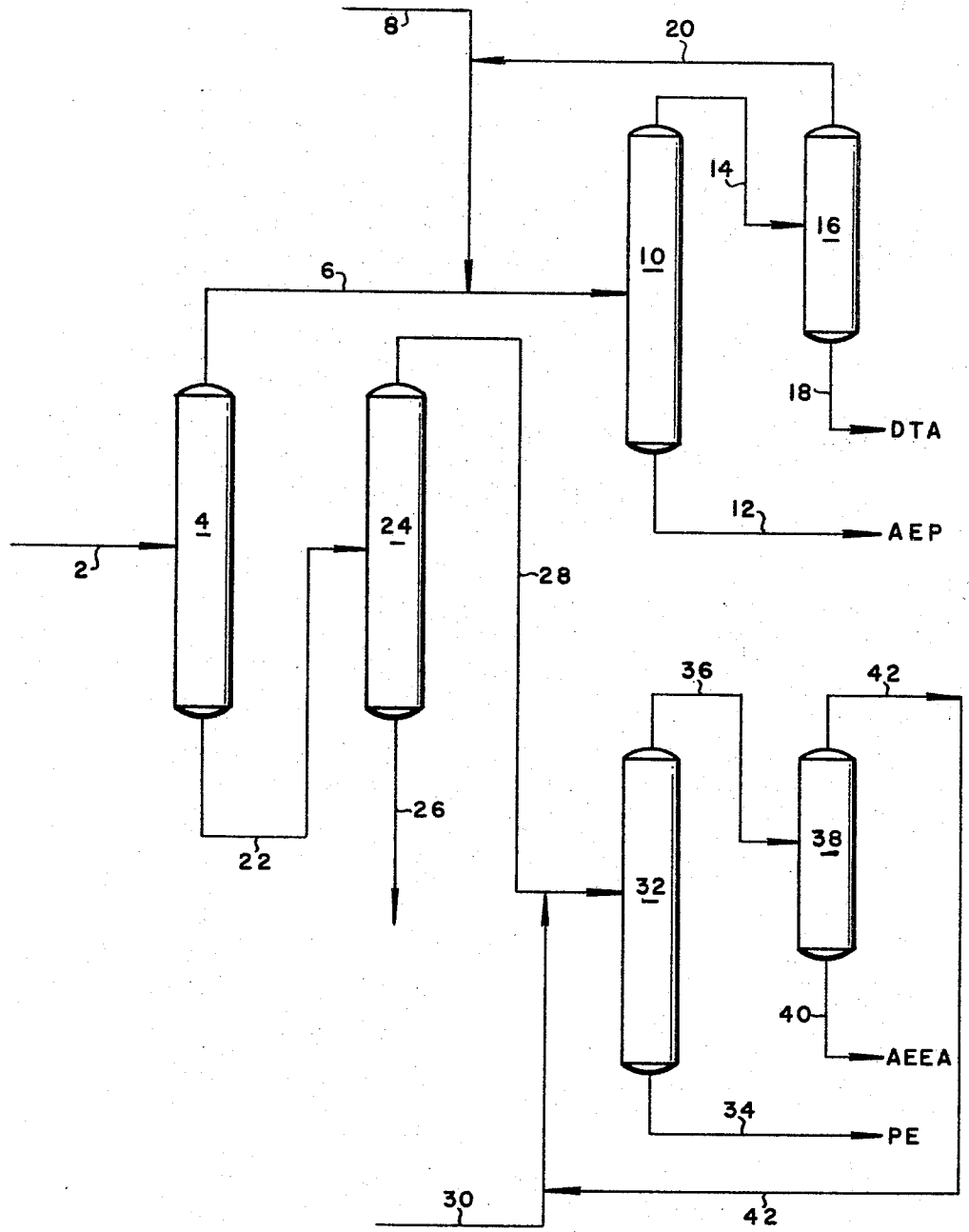

This invention describes a method for the separation of amines. More particularly, this invention is concerned with a method for the separation of by-product amines obtained in the production of piperazine.

The preparation of piperazine by the catalytic reductive amination of a compound such as ethylene glycol, monoethanolamine, diethanolamine, aminoethylethanolamine, ethylenediamine, diethylenetriamine, etc., is well known and described, for example, in United States Patents 3,037,023, 3,064,001, 3,068,232 and 3,138,598. In addition to the desired piperazine, there is obtained a high boiling residue which contains several valuable components. Four of the major components of this residue are listed below:

| Component: | Boiling point, ° C. |
|---|---|
| Diethylenetriamine | 207 |
| 1(2-aminoethyl)piperazine | 221 |
| Aminoethylethanolamine | 242 |
| 2-(1-piperazine)ethanol | 242 |

These compounds are useful in many applications, such as, for example, the curing of epoxy resins.

Heretofore, it has not been possible to obtain these four compounds in essentially pure form from the piperazine residue. Fractional distillation of the residue results in fractions which are still mixtures of compounds. Azeotropic distillation of the residue has likewise proved unsuccessful.

We have now discovered, however, that these compounds can be obtained from the residue employing a separation scheme which comprises a series of steps. The residue is first fractionally distilled to give a first fraction comprising essentially diethylenetriamine and aminoethylpiperazine, and a second fraction comprising essentially aminoethylethanolamine and piperazineethanol. We have found that by the proper choice of an entrainer each of these fractions can then be separated by azeotropic distillation into its component parts. In this manner, the compounds may be obtained in relatively pure form. It was totally unexpected that this particular sequence of two techniques that had separately proved unsuccessful would result in clean separations.

Isolation of a portion of the aminoethylpiperazine in fraction one is possible by a further fractional distillation of that fraction; however, no pure diethylenetriamine can be obtained nor can the second fraction be separated into its components by further fractional distillation. Azeotropic distillation must be employed for clean separations. However, azeotropic distillation is successful only after these two fractions have been separated from each other and the remainder of the piperazine residue.

The fractional distillation of the piperazine residue to obtain the two fractions as described hereinabove may be conducted in a continuous or a batch manner, all in accordance with known techniques. Because of the high boiling points of the desired components of the residue, the distillation is preferably conducted at reduced pressures, such as, for example, pressures of below 100 mm.

A typical batch fractionation was carried out in a 12-liter flask fitted with a 4' by 1" column packed with stainless steel protruded packing and a swinging bucket head. The system was equipped for a reduced pressure distillation. Using such a system to distill a residue resulting from the preparation of piperazine from monoethanolamine, a first fraction comprising diethylenetriamine and aminoethylpiperazine was obtained at a boiling range of 88° to 112° C. at a pressure of 10 mm. This fraction represented 42 to 46 wt. percent of the charge. A second fraction comprising aminoethylethanolamine and piperazineethanol was obtained at a boiling range of 112° to 138° C. at a pressure of 10 mm. This fraction represented 17 to 18 wt. percent of the charge.

Hydrocarbons immiscible with diethylenetriamine and boiling within the range of about 175° to about 250° C. are suitable entrainers for use in the separation of diethylenetriamine and aminoethylpiperazine. Two such entrainers are a tetrapropylene having a boiling range of approximately 182° to 220° C. and n-dodecane. The use of dodecane results in a faster distillation but cleaner separations are obtained using tetrapropylene. For this reason, tetrapropylene is the preferred entrainer. The separation is preferably conducted at reduced pressures of below about 100 mm. A typical separation of aminoethylpiperazine and diethylenetriamine by azeotropic distillation using a tetrapropylene entrainer is described in Example I.

*Example I*

A mixture of 100 g. of diethylenetriamine (DTA), 100 g. of aminoethylpiperazine (AEP) and 100 g. of tetrapropylene was distilled at a reflux ratio of 5:1 through a 3' column of protruded packing. The cuts obtained separated into a hydrocarbon layer and an amine layer, and the hydrocarbon layers from the first two cuts were returned to the still before collecting the next two cuts. The high purity of diethylenetriamine obtainable by this procedure is shown by the data in the following table.

| Cut No. | Head temp., ° C. | Pressure, mm. | Percent DTA |
|---|---|---|---|
| 1 | 63–74 | 20 | 92 |
| 2 | 74–79.5 | 20 | 97.5 |
| 3 | 86–100.5 | 58 | 100 |
| 4 | 100.5–105 | 58 | 99.5 |

Suitable entrainers for use in the separation of aminoethylethanolamine and piperazineethanol include aliphatic and aromatic hydrocarbons generally boiling below but within about 60° C. of the boiling points of the amines. Examples of such entrainers include tetrapropylene, Retardsol, diisopropylbenzene, tetralin, secondary amylbenzene and triethylbenzene. Retardsol is a mixture of aliphatic hydrocarbons having a boiling range of about 175° to 265° C. and manufactured by the American Mineral Spirits Company. The diisopropylbenzene employed was a mixture of 50% meta-, 40% para- and 10% ortho-isomers. The preferred entrainer is triethylbenzene. The separation is preferably conducted at reduced pressures of below about 100 mm. A typical separation using triethylbenzene as entrainer is shown in Example II.

*Example II*

A mixture of 30 g. of aminoethylethanolamine (AEEA), 30 g. of piperazineethanol (PE) and 50 g. of triethylbenzene was distilled through a 20" column of protruded packing into a special head which cooled the distillate to produce two liquid phases and returned the hydrocarbon layer to the column. The amine layer was collected in fractions and analyzed with the results shown below. The pot temperature range was 158° to 163° C., the head temperature range was 122° to 126° C. and the pressure range was 49 to 52 mm.

| Cut No. | Weight, g. | Analysis | |
|---|---|---|---|
| | | AEEA, wt. percent | PE, wt. percent |
| 1 | 11.0 | 97.0 | 3.0 |
| 2 | 9.0 | 97.0 | 3.0 |
| 3 | 6.5 | 95.0 | 5.0 |
| 4 | 4.0 | 83.0 | 17.0 |
| 5 | 3.0 | 54.0 | 46.0 |
| 6 | 5.0 | 26.5 | 73.5 |
| 7 | 3.5 | 5.0 | 95.0 |
| 8 | 17.0 | 0.5 | 99.5 |
| 9 | 1.5 | 0.5 | 99.5 |

It can thus be seen that a mixture of aminoethylethanolamine and piperazineethanol can be separated into relatively pure components despite their identical boiling points by azeotropic distillation with the proper entrainer.

The invention will be further illustrated by reference to the drawing, which depicts a typical scheme for the continuous separation of diethylenetriamine, aminoethylpiperazine, aminoethylethanolamine and piperazineethanol from a piperazine residue.

The residue containing the desired components is introduced by means of line 2 into distillation column 4, where it is separated into a first fraction comprising diethylenetriamine and aminoethylpiperazine and a second residue fraction. Said first fraction is carried by means of line 6 into distillation column 10. Prior to entering column 10 a hydrocarbon entrainer is introduced into the first fraction by means of line 8. In column 10, the said first fraction is separated into a bottoms product fraction comprising aminoethylpiperazine which is removed by means of line 12 and an overhead fraction comprising an azeotrope of the entrainer and diethylenetriamine. Said azeotrope is carried by means of line 14 into separator 16 where it is allowed to separate into a product fraction comprising diethylenetriamine which is removed by means of line 18 and a fraction comprising the entrainer which is recycled by means of line 20 to line 8.

Returning now to the residue fraction from distillation column 4, this fraction, containing aminoethylethanolamine and piperazineethanol, is carried by means of line 22 into a second distillation column 24. In distillation column 24, said residue fraction is separated into a third residue fraction which is removed by means of line 26 and a second overhead fraction comprising aminoethylethanolamine and piperazineethanol. Said second overhead fraction is carried by means of line 28 into distillation column 32. Prior to entering distillation column 32, a hydrocarbon entrainer is introduced into said second overhead fraction by means of line 30. In column 32, this mixture is separated into a bottoms fraction comprising product piperazineethanol, which is removed by means of line 34, and an overhead azeotropic fraction comprising the entrainer and aminoethylethanolamine. Said overhead azeotropic fraction is carried by line 36 to separator 38, where it is allowed to separate into a product aminoethylethanolamine fraction, which is removed by means of line 40 and a fraction comprising the entrainer which is recycled by means of line 42.

Having thus described our invention, what we claim is:

1. A method for the separation of diethylenetriamine, 1-(2-aminoethyl)piperazine, aminoethylethanolamine and 2-(1-piperazine)ethanol in relatively pure form from the residue obtained in the preparation of piperazine by a catalytic reductive amination reaction which comprises:
   (a) fractionally distilling said residue to obtain a first fraction comprising essentially diethylenetriamine and 1-(2-aminoethyl)piperazine and a second fraction comprising essentially aminoethylethanolamine and 2-(1-piperazine)ethanol;
   (b) azeotropically distilling said first fraction using a hydrocarbon entrainer immiscible with diethylenetriamine and boiling within the range of about 175° to about 250° C. to separate thereby said first fraction into diethylenetriamine and 1-(2-aminoethyl)piperazine; and
   (c) azeotropically distilling said second fraction using a hydrocarbon entrainer generally boiling below but within about 60° C. of the boiling points of the desired amine components to separate thereby said second fraction into aminoethylethanolamine and 2-(1-piperazine)ethanol.

2. A method as in claim 1 wherein all distillations are conducted at a pressure not exceeding 100 mm., the entrainer used in the azeotropic distillation of the first fraction is tetrapropylene and the entrainer used in the azeotropic distillation of the second fraction is triethylbenzene.

References Cited

UNITED STATES PATENTS

| 3,033,864 | 5/1962 | Britton et al. | 203—69 |
| 3,038,904 | 6/1962 | Godfrey | 260—268 |
| 3,105,019 | 9/1963 | Murray et al. | 203—68 |
| 3,151,115 | 9/1964 | Moss et al. | 260—268 |

FOREIGN PATENTS 658,665  2/1963  Canada.

NORMAN YUDKOFF, *Primary Examiner.*

D. EDWARDS, *Assistant Examiner.*